(12) United States Patent
Hotz et al.

(10) Patent No.: US 6,168,763 B1
(45) Date of Patent: Jan. 2, 2001

(54) ELECTRICALLY HEATABLE CATALYTIC CONVERTER

(75) Inventors: Uwe Hotz, Muggensturm; Ulrich Renz, Walderbuch, both of (DE)

(73) Assignee: Heraeus Electro-Nite International N.V., Houthalen (BE)

( * ) Notice: Under 35 U.S.C. 154(b), the term of this patent shall be extended for 0 days.

(21) Appl. No.: 09/087,071

(22) Filed: May 29, 1998

(30) Foreign Application Priority Data

Jun. 3, 1997 (DE) ............................................. 197 23 121

(51) Int. Cl.[7] ....................................................... F01N 3/28
(52) U.S. Cl. ........................ 422/174; 422/177; 422/179; 422/180; 219/552; 392/485
(58) Field of Search ................................... 422/174, 180, 422/177, 179; 60/299, 300; 219/552; 392/485

(56) References Cited

FOREIGN PATENT DOCUMENTS

| 42 43 904 A1 | 6/1994 | (DE) . |
| WO 89/10470 | 11/1989 | (WO) . |
| 94/15079 * | 7/1994 | (WO) . |

* cited by examiner

Primary Examiner—Hien Tran
(74) Attorney, Agent, or Firm—George H. Gerstman; Seyfarth, Shaw

(57) ABSTRACT

An electrically heatable catalytic converter for the cleaning of exhaust gas from combustion processes, preferably from internal combustion engines, comprising a shell and a carrier located inside the shell, preferably with a multitude of parallel channels through which the exhaust gas being cleaned can flow, where the carrier exhibits at least one layer that is catalytically active in relation to the exhaust gas, and where, furthermore, at least a portion of the surface of the carrier exhibits at least one electrically conductive resistance heating layer with electrical connection areas, which is insulated against the carrier by means of an insulation layer, and with at least one connection element that contacts the resistance heating layer in the electrical connection areas, is easily manufactured and reliable during operation if at least one connection element runs through the resistance heating layer and the insulation layer, as well as the carrier.

5 Claims, 1 Drawing Sheet

ELECTRICALLY HEATABLE CATALYTIC CONVERTER

FIELD OF THE INVENTION

The invention relates to an electrically heatable catalytic converter for the cleaning of exhaust gas from combustion processes.

BACKGROUND OF THE INVENTION

A generic catalytic converter is known from DE 42 43 904 A1. The known catalytic converter exhibits an external, closed shell into which a so-called monolith is embedded. The monolith of the catalytic converter which, in connection with this patent application, is also known as the carrier, is primarily a layered arrangement of smooth, flat metal foils or plates and corrugated metal foils or plates. The corrugated metal foils extend across the exhaust gas flow, with the corrugations being positioned in parallel to the exhaust gas flow and each forming channels for the exhaust gas flowing through. The carrier of the catalytic converter is coated with a wash coating in which platinum metals are embedded or onto which they are applied. Every third or fourth flat metal foil projects laterally at a right angle to the exhaust gas flow across the portion of the monolith that is interspersed with channels and exhibits, on each side of the monolith, an annular contact surface that has been printed using sealed layer technology. A resistance heating layer that has been printed using sealed layer technology and is electrically insulated against the carrier plate runs between the two contact surfaces of a smooth plate. Electrical contacting of the metal foils equipped with heating elements is achieved by means of electrically conductive rings, each of which is positioned between two opposing connection areas of the metal foils. The rings are arranged between the protruding ends of the metal foils in a stack with the same height as that of the monolith, and are pressed together with a continuous screw element, with the compression force ensuring a permanent contact between the rings and the connection areas. The rings, in turn, are connected to an electrical power supply by means of high-temperature resistant soldered connection wires.

The manufacture of the known electrically heatable catalytic converter is relatively complex.

There are other technical solutions for electrically heatable catalytic converters in which either the metal carrier foil of the monolith is traversed by current and is thus heated, or in which a separate electric heating element indirectly heats the carrier frame of the catalytic converter. Examples of these other technical solutions are found in DE-PS 563 757 or in WO89/10470. These technical solutions are more removed from the object of the invention than the aforementioned DE 42 43 904 A1.

The objective of the invention is to redesign a generic electrically heatable catalytic converter in such a way as to simplify its manufacture.

This objective is solved with an electrically heatable catalytic converter with the features of the present invention.

SUMMARY OF THE INVENTION

An electrically heatable catalytic converter for the cleaning of exhaust gas from combustion processes is provided. The catalytic converter includes a shell and a carrier inside the shell defining channels through which the exhaust gas being cleaned can flow. A layer on the carrier is catalytically active in relation to the exhaust gas. An electrically conductive resistance heating layer with electrical connection areas covers at least a portion of the surface of the carrier. An insulation layer is interposed between the carrier and the heating layer. One or more electrical connection elements contact the heating layer in the electrical connection areas and pass through the carrier and the insulation layer.

Because the connection elements run through the resistance heating layer, the insulation layer, and the carrier, the connection elements are fastened in interlocking fashion in a direction which parallels the layers and the carrier. Any remnants which act on the connection elements as a result of thermal expansion or acceleration forces can be directed or fed into the carrier in this manner. This removes stress from the sites where electrical contact is established.

It is advantageous if the carrier features openings, e.g., in the form of punched holes, in the vicinity of the connection areas. In this case, the connection elements can simply be inserted into the openings. If, in addition, a second insulation layer is to be provided on the side of the carrier facing away from the resistance heating layer, each connection element can be molded against the insulation layer on the side facing the resistance heating layer. In this case, the second insulation layer preferably exhibits approximately the same dimensions as the connection area, thus eliminating the need to apply unnecessary excess material. Nevertheless, it is advantageous if each opening is surrounded by a second layer of insulation, as this allows each connection element to be molded against the surface facing away from the resistance heating layer.

To ensure a simple and stable connection, the connection elements should, if possible, be form-fitted to match the openings, i.e., they should not just be form-fitting in parallel to the layers and to the carrier, but should also be secured in the openings in a form-fitting manner in the direction of insertion. The connection elements inside the openings should remain separated from the carrier, so that an electrical contact is not established between the connection elements and the carrier. A simple design is provided if the connection elements include a tubular projection. This tubular projection can be centered in the openings and, if its diameter is smaller than the inner diameter of the openings, provides adequate spacing from the carrier. In a particularly simple design, the connection elements are retained in the openings by means of plastic deformation and, particularly, by means of riveting. The connection elements can also be secured by welding them to the connection areas. This measure can be provided on its own or in addition to riveting. It may, in particular, involve thermal welding processes, such as resistance pressure welding, laser welding, or ultrasonic welding onto the resistance heating surface. The welding of connection elements to resistance heating layers is particularly reliable if a supplemental contact layer is applied.

Even though the manner of securing the connection elements in the carrier according to the invention is exceptionally stable, it is advantageous if the connection elements—at least those that are at right angles to the direction of exhaust gas flow—are designed as spring elastic elements. This reduces their sensitivity to vibration and thermal expansion.

A simple design is provided when a shared connection element is allocated to each pair of resistance heating layers in adjacent connection areas. The contacting of two resistance heating layers can be achieved with one continuous, tubular protrusion which runs through both carriers and both resistance heating layers and is riveted to one of the resistance heating layers. A space is advantageously maintained between the applicable carriers by means of a washer.

An illustrative example of the catalytic converter according to the invention is described below on the basis of the drawing.

DETAILED DESCRIPTION OF THE ILLUSTRATIVE EMBODIMENTS

Figure 1:
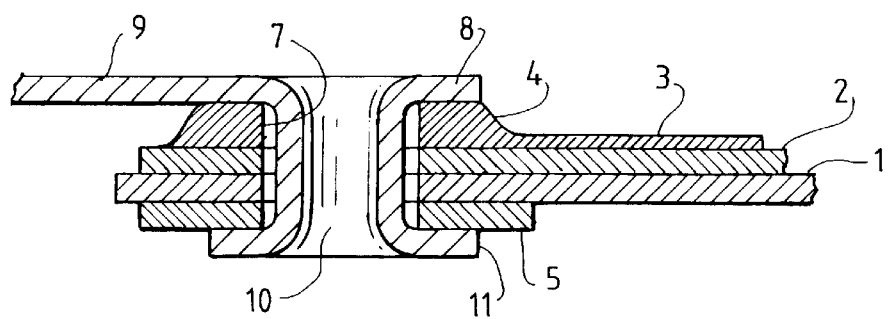
FIG. 1: depicts the contacting of a connection element with a resistance heating layer according to the invention.

The connection area of an electrically heatable carrier foil 1 of a metal catalytic converter is depicted in FIG. 1. The carrier foil is made of a corrosion-resistant and temperature-resistant material, and is covered on one side with an insulation layer 2 which has been applied to the entire surface by means of screen printing. The insulation layer 2 itself bears a resistance heating layer 3 on the side facing away from the carrier foil 1, the electric resistance of which is suitable for being heated by the on-board voltage of a motor vehicle. Along a lateral portion of the carrier foil 1, the resistance layer 3 is thickened due to the application of an additional contact layer 4 with the same composition as the resistance heating layer 3. A second insulation layer 5 covering approximately the same area as the contact layer 4 is positioned on the side of the carrier foil 1 that faces away from the resistance heating layer 3; this insulation layer also insulates the connection area of the carrier foil 1 on the second flat surface. The entire connection area is interspersed, concentrically to the thickened area 4 and the second insulation layer 5, if possible, by an opening 7, such as one consisting of a round punched hole.

A connection element 8 is inserted into the round punched opening 7; this element may, for example, consist of a flat, band-shaped contact flag 9 with a molded tubular segment 10. The connection element is molded around the end of the tubular segment 10 opposite the connection flag 9, so that a marginal section 11 is flush against the second insulation layer 5.

In this manner, the connection element 8 is electrically insulated against the carrier foil 1 and is secured to and electrically contacted with the resistance heating layer 3 in the punched opening 7.

Figure 2:
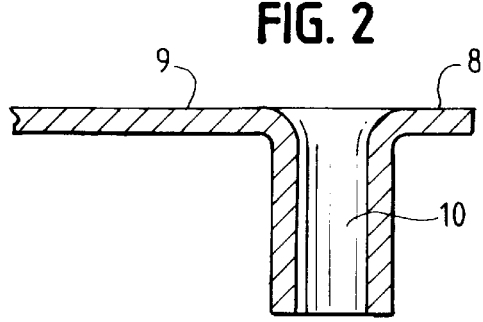
FIG. 2: depicts the connection element according to FIG. 1 in its unmolded state.

FIG. 2 depicts the connection element 8 with the connection flag 9 and the tubular segment 10 in its unmolded state. In this form, the connection element 9 can be inserted into the opening 7 after which it may, for example, be riveted.

Figure 3:
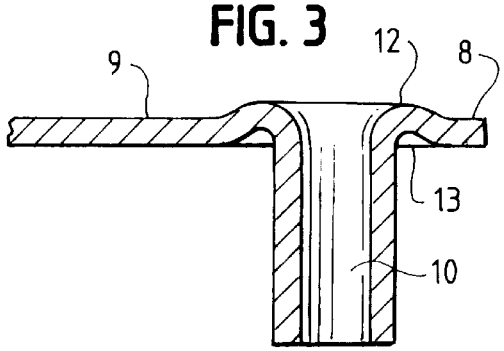
FIG. 3: depicts another embodiment of a connection element.

FIG. 3 depicts another embodiment of a connection element 8, in which an annular ridge 12 is shaped into the transitional area between the connection flag 9 and the molded sleeve 10; this annular ridge forms a recess 13 in the groove between the flat area and the molded sleeve.

Figure 4:
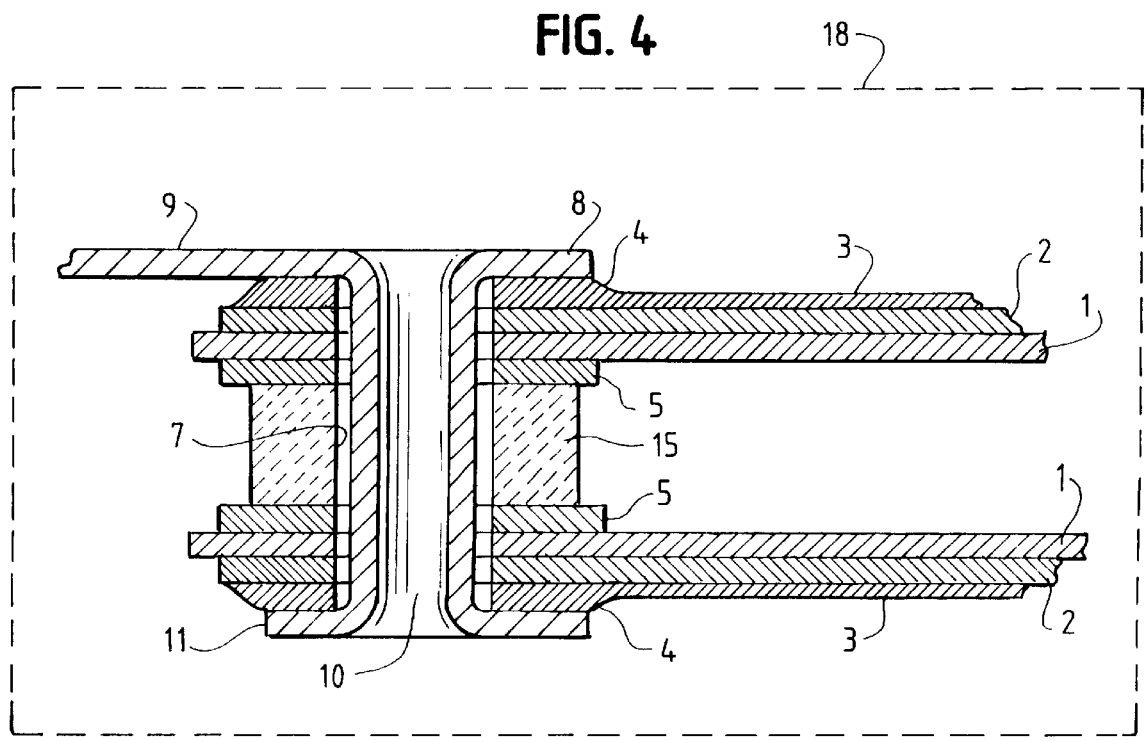
FIG. 4: depicts the connection of two carrier foils with one resistance heating layer each by means of a shared connection element.

FIG. 4 depicts the electrical contacting of two electrically heatable catalytic converter foils with a shared connection element 8.

The foils, which conform structurally to the catalytic converter foil depicted in FIG. 1 and comprise a carrier foil 1, an insulation layer 2, a resistance heating layer 3 with an additional contact layer 4, as well as the opposing second insulation layer 5, are mutually arranged in such a way that the two second insulation layers 5 face one another, while the resistance heating layers 3 face away from one another. A spacer 15 provided in the vicinity of the second insulation layers 5 maintains the desired distance between the catalytic converter foils and is resistant to pressure.

As depicted in FIG. 4, the connection element 8, within shell or housing 18 is arranged in such a way that the coaxially positioned openings in the upper and lower carrier foil and the spacer 15 are interspersed by the tubular segment 10, with a recess or opening 7 separating the carrier foils 1 from the tubular segment 10. In this illustrative example, the edge zone or marginal section 11 of the tubular segment 10 surrounds the supplemental contact layer 4 of the catalytic converter foil depicted at the bottom of FIG. 4, thereby securing the connection element 8 in the foil packet while simultaneously positioning the two foils and the spacer 15 against one another.

In this illustrative example, the edge zone 11 of the tubular segment 10 is responsible for electrical contacting of the resistance heating layer 3 of the lower catalytic converter foil.

In this manner, a shared connection element 8 provides both the mechanical and the electrical connection between the two adjacent catalytic converter foils.

In the contacting solution according to FIG. 4, the insulation layers 5 may also be eliminated if electrical insulation between the two carrier foils is not required. In that case, the carrier foils 1 may be connected to one another to promote direct mechanical stability with the spacer 15, e.g., by means of laser welding.

In a manner known in the art, an electrically heatable catalytic converter is manufactured by first applying the insulation layers 2 and 5 to several carrier foils 1 in a silk screening process. Once these layers have been burned in, the electrical resistance layer 3 and the supplemental contact layer 4 are also applied in a silk screening process. Then the openings in the connection area on the catalytic converter foils are punched at points that are approximately centered on the supplemental contact layer 4. Every two catalytic converter foils are arranged in such a way that the second insulation layers 5 are facing one another and are separated by a spacer 15. Then the connection element 8 is fed through the openings and riveted to the sides opposite the connection flag 9. A suitable mechanical and electrical connection is established at the opposite end of the oblong catalytic converter foil, which is not depicted in the figure. The requisite number of these "double" catalytic converter foils needed for a given heat output and gas flow are then joined together to form a monolith, which features a shared electrical connection element at each of its two ends and is coated with a wash coat containing the catalytically active substances. The resulting catalytic converter monolith is then embedded in a catalytic converter shell for subsequent installation into the exhaust gas system of a motor vehicle.

Typical dimensions for carrier foil 1 thickness are about 50 $\mu$m, while the insulation layer 2 is about 20 $\mu$m thick and the resistance heating layer is about 10 to 15 $\mu$km thick. The resistance heating layer is preferably thickened to more than 60 $\mu$m in the connection area. The distance between the two carrier foils 1, i.e., the approximate height of the spacer 15, is about 3 mm. In a preferred illustrative example, the inside diameter of the recess 7 is 5 mm, while the outside diameter of the ring-shaped segment 10 is about 3 mm. These dimensions have proven to be suitable for an electrically heatable exhaust gas catalytic converter for the exhaust gas of a motor vehicle engine.

If voltage is applied to the connection elements 8, a current flows from one side of the catalytic converter foil, through the resistance heating layer 3, and to the connection element 8 on the opposite side. The resistance heating layer 3 heats itself and the wash coat layer on top of it until a catalytic effect is applied to the exhaust gas being cleaned. As a result of the heat being released in response to the catalytic reaction and the heat being brought in by the hot exhaust gas, the monolith continues to heat up, so that the electrical power supply can be switched off shortly after starting.

What is claimed:

1. An electrically heatable catalytic converter with one or more pairs of resistance heating layers sharing a common connection comprising:

a shell;

one or more pairs of carriers located inside said shell defining at least one channel through which the exhaust gas being cleaned can flow and having opposed catalytically active layers;

electrically conductive resistance heating layers with electrical connection areas covering a portion of the surface of each of said carriers on the side opposite the catalytically active layers;

insulation layers between said carriers and said heating layers;

a spacer between said carriers; and an electrical connection element contacting each of said heating layers in said electrical connection areas and passing through said carriers, said insulation layers and said spacer.

2. The electrically heatable catalytic converter of claim 1 further comprising one or more insulation layers between said carriers and said spacer.

3. The electrically heatable catalytic converter of claim 1 further comprising one or more layers of electrically conductive material applied to said heating layers in said connection areas.

4. A subassembly for use in electrically heatable catalytic convertors, which subassembly comprises:

one or more pairs of resistance heating layers sharing a common connection comprising: one or more pairs of carriers defining at least one channel through which the exhaust gas being cleaned can flow and having opposed catalytically active layers;

electrically conductive resistance heating layers with electrical connection areas covering a portion of a surface of each of said carriers on the side opposite the catalytically active layers;

insulation layers between said carriers and said heating layers;

a spacer between said carriers; and an electrical connection element contacting each of said heating layers in said electrical connection areas and passing through said carriers, said insulation layers, and said spacer.

5. The subassembly of claim 4 which further comprises at least one insulation layer between said carriers and said spacer.

* * * * *